United States Patent
Khan et al.

(10) Patent No.: US 11,274,563 B2
(45) Date of Patent: Mar. 15, 2022

(54) TURBINE REAR FRAME FOR A TURBINE ENGINE

(71) Applicant: General Electric Company, Schenectady, NY (US)

(72) Inventors: Mohsin Hasan Khan, Sirohi (IN); Sarasija Sudharsan, Chennai (IN); Ganesh Seshadri, Bangalore (IN); Ravikanth Avancha, Bangalore (IN); Lyle Douglas Dailey, West Chester, OH (US)

(73) Assignee: General Electric Company, Schenectady, NY (US)

(*) Notice: Subject to any disclaimer, the term of this patent is extended or adjusted under 35 U.S.C. 154(b) by 368 days.

(21) Appl. No.: 15/002,782

(22) Filed: Jan. 21, 2016

(65) Prior Publication Data

US 2017/0211399 A1   Jul. 27, 2017

(51) Int. Cl.
| | |
|---|---|
| *F01D 9/04* | (2006.01) |
| *F01D 25/16* | (2006.01) |
| *F01D 5/14* | (2006.01) |
| *F02C 7/20* | (2006.01) |
| *F01D 25/24* | (2006.01) |

(52) U.S. Cl.
CPC ............ *F01D 9/041* (2013.01); *F01D 5/141* (2013.01); *F01D 5/143* (2013.01); *F01D 25/162* (2013.01); *F01D 25/246* (2013.01); *F02C 7/20* (2013.01); *F05D 2220/32* (2013.01);
(Continued)

(58) Field of Classification Search
CPC ..... F01D 9/04; F01D 9/41; F01D 9/00; F01D 9/02; F01D 25/24; F01D 25/246; F01D 25/28; F01D 25/162; F01D 5/141; F01D 5/142; F01D 5/143; Y02T 50/673; F05D 2250/71; F05D 2250/711; F05D 2250/712
See application file for complete search history.

(56) References Cited

U.S. PATENT DOCUMENTS

| | | | | |
|---|---|---|---|---|
| 4,883,407 A | * | 11/1989 | Touze ................. | F01D 5/066 415/190 |
| 5,249,922 A | * | 10/1993 | Sato .................... | F01D 5/142 415/191 |

(Continued)

FOREIGN PATENT DOCUMENTS

CN    104903549 A    9/2015

OTHER PUBLICATIONS

Extended European Search Report and Opinion issued in connection with corresponding EP Application No. 17152373.1 dated May 24, 2017.

(Continued)

*Primary Examiner* — Woody A Lee, Jr.
*Assistant Examiner* — Elton K Wong
(74) *Attorney, Agent, or Firm* — McGarry Bair PC

(57) ABSTRACT

A turbine rear frame for a gas turbine engine comprises a plurality of struts disposed between an outer ring and an inner ring. The struts can be mounted adjacent to one or more mount surfaces defined within the outer ring. The mount surface can comprise a recess in the outer ring having a maximum radial distance upstream of engine mounts inserted therein. The struts can further comprise a pitch angle offset from a centerline of the mount surface and a tangentially curved trailing edge at a tip to improve aerodynamic performance of the turbine rear frame.

23 Claims, 6 Drawing Sheets

(52) U.S. Cl.
CPC ...... *F05D 2240/90* (2013.01); *F05D 2250/71* (2013.01); *Y02T 50/60* (2013.01)

(56) References Cited

U.S. PATENT DOCUMENTS

| | | | | |
|---|---|---|---|---|
| 5,259,183 | A | * | 11/1993 | Debeneix ............... B64D 27/26 |
| | | | | 60/797 |
| 6,997,676 | B2 | | 2/2006 | Koshoffer |
| 7,195,456 | B2 | | 3/2007 | Aggarwala et al. |
| 9,970,320 | B2 | | 5/2018 | De Sousa et al. |
| 2005/0008485 | A1 | * | 1/2005 | Tsuru ...................... F01D 5/141 |
| | | | | 415/208.2 |
| 2005/0201856 | A1 | * | 9/2005 | Koshoffer ............... F01D 5/146 |
| | | | | 415/115 |
| 2006/0133930 | A1 | * | 6/2006 | Aggarwala ............. F01D 5/145 |
| | | | | 415/191 |
| 2012/0093642 | A1 | * | 4/2012 | Nilsson .................... F01D 9/04 |
| | | | | 415/213.1 |
| 2012/0111023 | A1 | | 5/2012 | Sjöqvist |
| 2015/0176420 | A1 | * | 6/2015 | Sjoqvist ................. F01D 9/041 |
| | | | | 415/210.1 |
| 2015/0285098 | A1 | * | 10/2015 | De Sousa ................ F01D 9/04 |
| | | | | 415/214.1 |

OTHER PUBLICATIONS

Chinese Patent Office; Search Report in Chinese Patent Application No. 2017100420514; dated May 7, 2019; 10 pages; Beijing, China.

* cited by examiner

TURBINE REAR FRAME FOR A TURBINE ENGINE

BACKGROUND OF THE INVENTION

Gas turbine engines have been used for land and nautical locomotion and power generation, but are most commonly used for aeronautical applications such as for airplanes, including helicopters. In airplanes, gas turbine engines are used for propulsion of the aircraft. Turbine engines are rotary engines that extract energy from a flow of combusted gases passing through the engine in a series of compressor stages, which include pairs of rotating blades and stationary vanes, through a combustor, and then onto a multitude of turbine blades. The gas turbine engine typically mounts to the aircraft with a plurality of struts at the turbine rear frame which can comprise additional stationary vanes within the gas airflow path.

Gas turbine engines for aircraft are designed to operate at high temperatures and pressures to maximize engine thrust. In order to maximize thrust, it is important to maintain the flow direction that exits the gas turbine in an axial state. The turbine rear frame comprises struts that serve to turn the flow direction from the low pressure turbine to an axial direction as the flow exits the engine. Typically, the struts attach to a mount lug disposed within a recess in an outer casing of the engine.

BRIEF DESCRIPTION OF THE INVENTION

In one aspect, a turbine rear frame for a gas turbine engine having an engine centerline comprising an outer ring having at least one lug mount defining a recess and an inner ring located within the outer ring defining an annular flow passage between the outer and inner rings. The engine further comprises at least one strut coupled to the lug mount and located within the annular flow passage and extending between the inner and outer rings, with the at least one strut having an airfoil shape defining a leading edge, a trailing edge, a root located at the inner ring, and a tip located at the recess of the outer ring. The engine further comprises at least one engine mount provided in the recess of the outer ring opposite of the tip. The lug mount is shaped such that a maximum radial distance of the recess occurs upstream of a chord-wise center of the strut defined axially.

In another aspect, a turbine rear frame for a gas turbine engine having an engine centerline comprising an outer ring having at least one lug mount defining a recess in the outer ring and an inner ring located within the outer ring defining an annular flow passage between the outer and inner rings. The engine further comprises at least one strut located within the annular flow passage and extending between the inner and outer rings. The engine further comprises at least one engine mount provided in the recess of the outer ring. The lug mount is shaped having a maximum radial distance of the recess upstream of a chord-wise center of the strut defined axially.

In yet another aspect, a vane segment for a turbine rear frame of a gas turbine engine having an engine centerline, with the vane segment comprising circumferentially spaced airfoils positioned between portions of an outer ring and an inner ring. A mount surface is shaped with a maximum radial distance of the recess upstream of a chord-wise center of the strut defined axially.

DESCRIPTION OF EMBODIMENTS OF THE INVENTION

Figure 1:
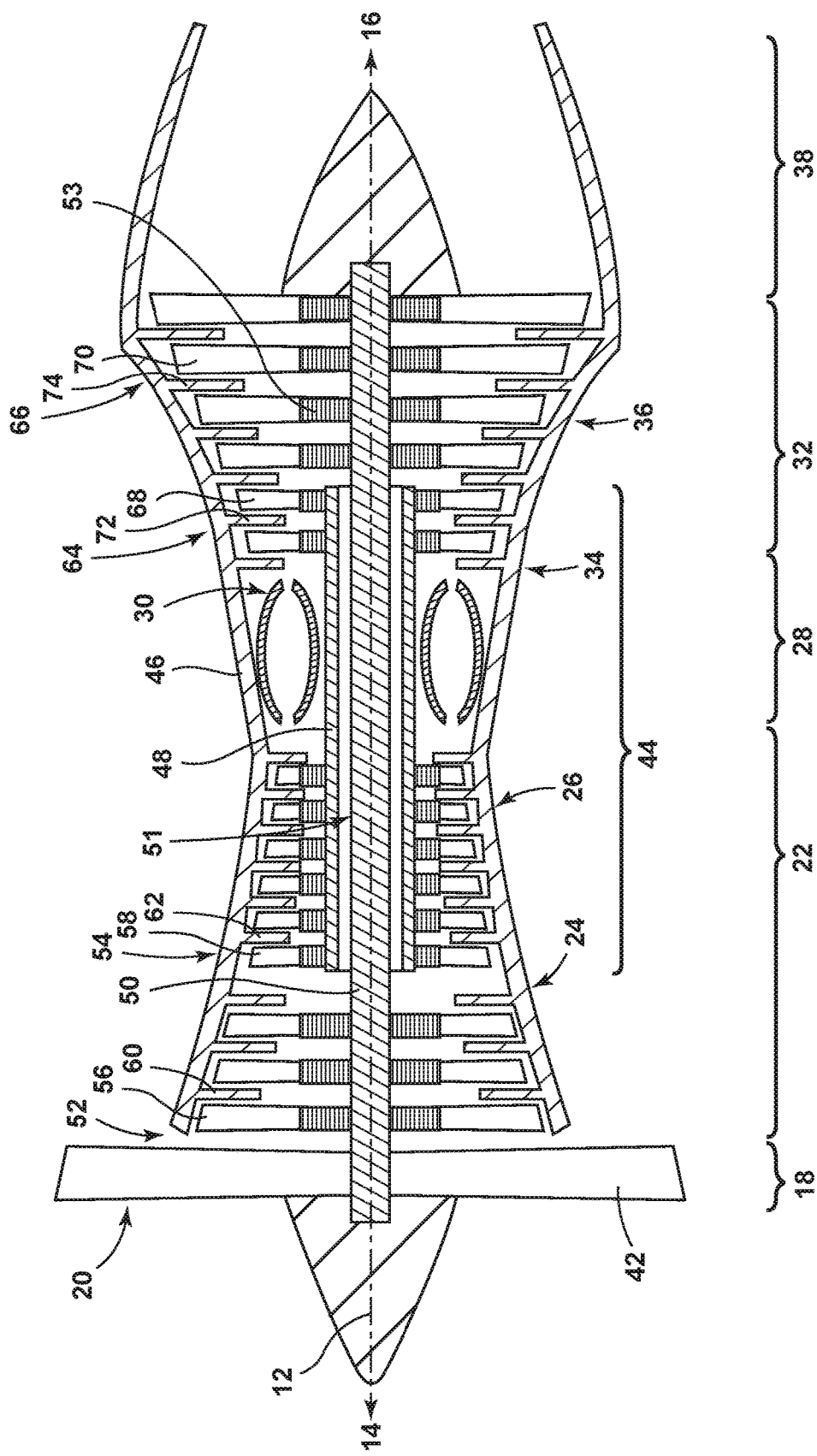
FIG. 1 is a schematic, axial cross-sectional view of a gas turbine engine.

The described aspects of the present invention are directed to a turbine rear frame, particularly in a gas turbine engine. For purposes of illustration, the present invention will be described with respect to an aircraft gas turbine engine. It will be understood, however, that the invention is not so limited and can have general applicability in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes the fan having a plurality of fan blades 42 disposed radially about the centerline 12. The HP compressor 26, the combustor 30, and the HP turbine 34 form a core 44 of the engine 10, which generates combustion gases.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are also referred to individually or collectively as a rotor 51.

The LP compressor 24 and the HP compressor 26 respectively include a plurality of compressor stages 52, 54, in which a set of compressor blades 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, with each stage having its own disk. The vanes 60, 62 are mounted to the core casing 46 in a circumferential arrangement about the rotor 51.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26.

Figure 2:
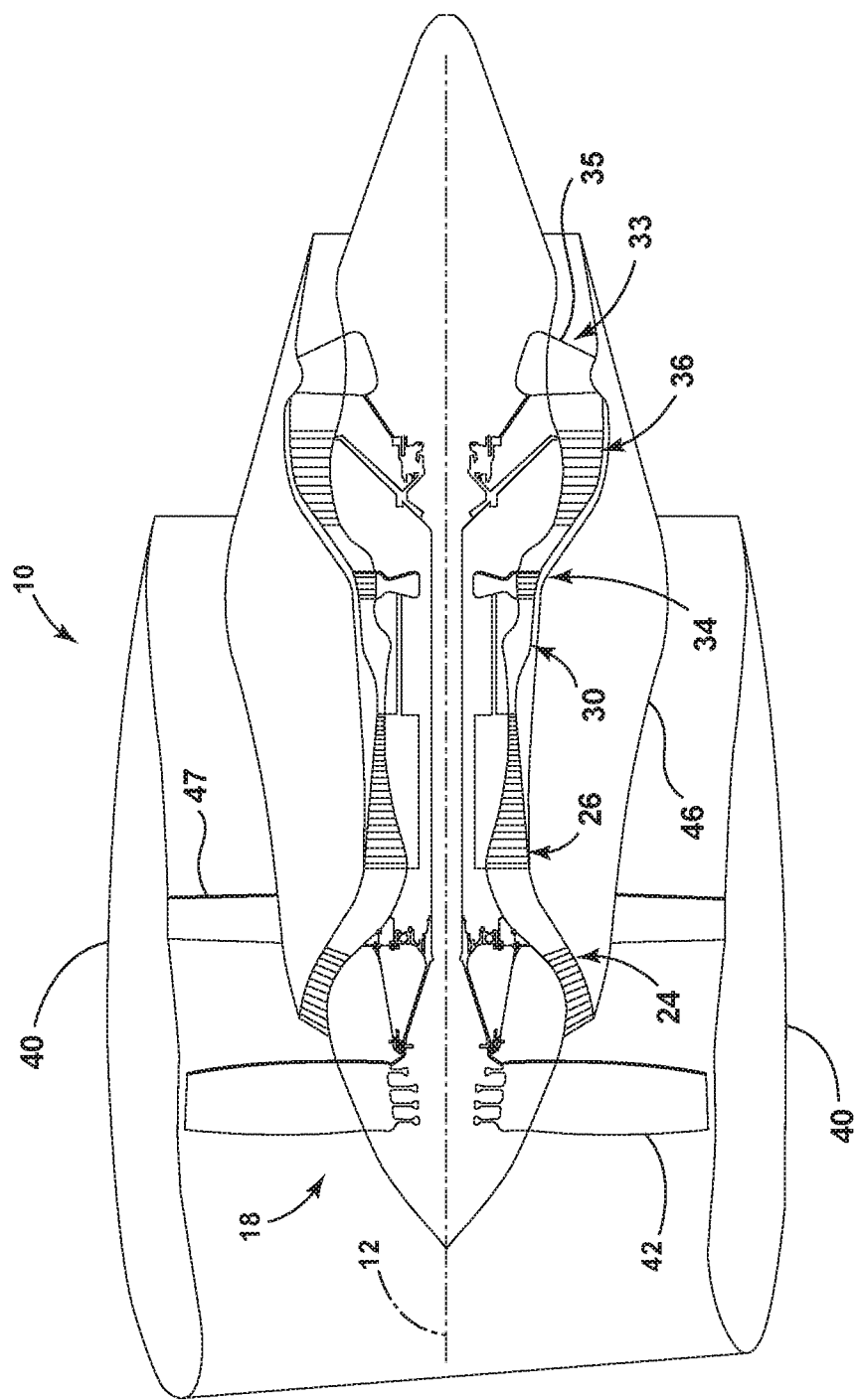
FIG. 2 is a schematic view of the engine of FIG. 1 with an outer casing and a turbine rear frame.

In FIG. 2, the engine 10 of FIG. 1 is disposed within an outer casing 40. The outer casing 40 can mount to the core casing 46 by a plurality of annular mounts 47. A turbine rear frame 33 is disposed downstream of the low-pressure turbine 36. The turbine rear frame 33 can comprise a mounting surface for mounting the engine to the aircraft, such as with one or more pylons for attachment to a wing. The turbine rear frame 33 can comprise a plurality of struts 35 mounted within the core casing 46. The struts 35 provide a rigid surface between the core casing 46 and the internal components of the engine core 44, such as the LP spool 50, as well as can turn the airflow exiting the engine core 44 from an angular or swirling direction to an axial direction when exhausting the airflow.

Figure 3:
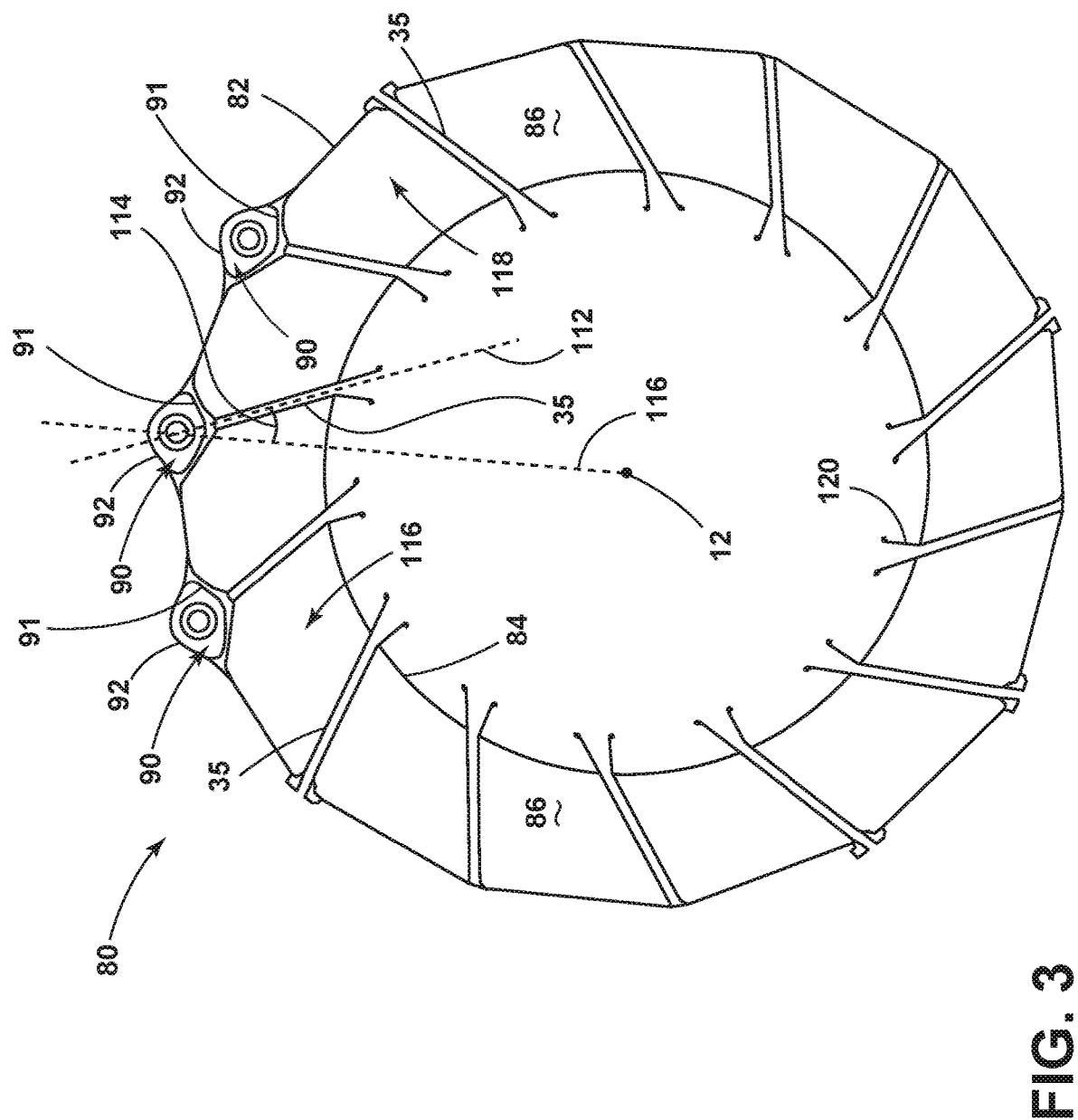
FIG. 3 is a radial cross-section of the turbine rear frame of FIG. 2.

Turning to FIG. 3, a radial cross-section of the turbine rear frame 80 illustrates the disposition of a plurality of the struts 35 annularly extending between an outer and inner ring or band 82, 84. The struts 35 or vane segments can mount between the bands 82, 84 within an annular flow passage 86. The outer band 82 can have one or more mount surfaces 91 extending radially inward, relative to the engine centerline 12. The mount surfaces 91 can define mount recesses 90 disposed in the outer band 82 adjacent to one or more struts 35. One or more engine mounts 92, which can comprise clevis mounts or lug mounts in non-limiting examples, can be disposed within the recess 90, mounted to the outer band 82 providing additional space for placement of the engine mounts 92 without extending excessively from the engine 10. The engine mounts 92 provide for mounting the engine 10 to the aircraft, typically to pylons (not shown) on the aircraft.

The view is illustrated as looking aft through the turbine rear frame 80, having the engine centerline 12 disposed in the center thereof. Three struts 35 are disposed adjacent to mount surfaces 91 providing for sets of engine mounts 92 to be disposed within the recesses 90. The struts 35 can have diverging ends 120 utilized to facilitate mounting to the inner band 84. The fourteen struts 35, three mount surfaces 91, and engine mounts 92 as illustrated should be understood as exemplary. More or less struts 35, mount surfaces 91, and engine mounts 92 can be implemented in the engine 10 and should not be construed as limiting.

Each strut 35 can define a span-wise body axis as a strut body axis 112, extending in the span-wise direction along the strut 35. The strut 35 can be angled such that the strut body axis 112 defines a strut angle 114 relative to an engine radial axis 116 extending radially from the engine centerline 12 through the engine mounts 92. Adjacent struts 35 can further define a flow passage such that the flow area 118 is disposed between the adjacent struts 35. A maximum radial distance for the annular flow passage 86 can be disposed in the flow area 118. It should be appreciated that the struts 35 are non-diverging adjacent the mount surfaces 91, such that the flow area 118 can be non-converging in the flow direction through the annular flow passage.

In an alternative example, the bands 82, 84, mount surface 91, and struts 35 can comprise fillets disposed at the junctions between one another, or can be integral with the fillets or adapted such that a filleted surface is defined at the junctions.

Figure 4:
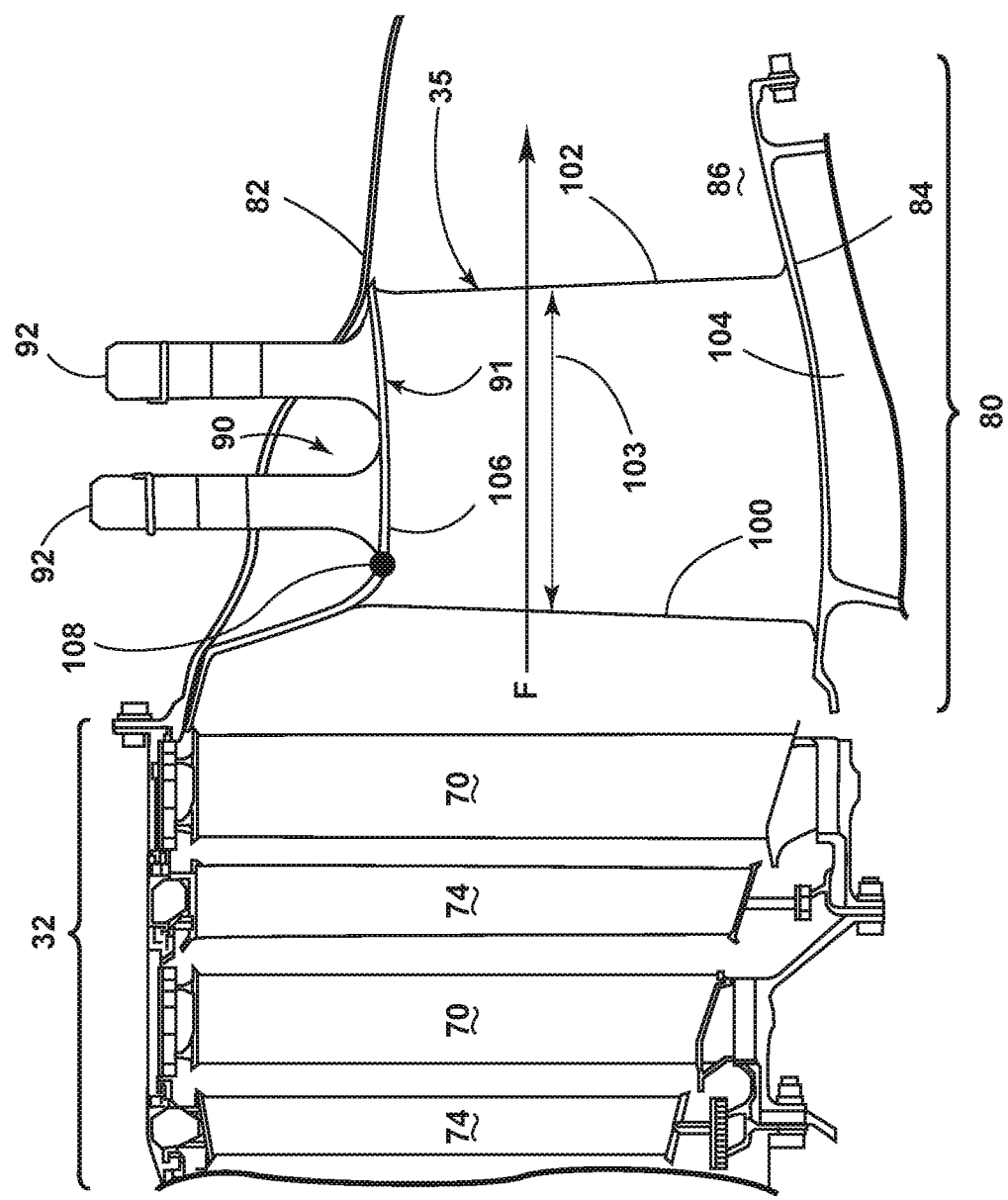
FIG. 4 is an enlarged view of a low-pressure turbine section engine of FIG. 1 coupled to the turbine rear frame.

Turning now to FIG. 4, a mainstream flow F of air can pass through the annular flow passage 86 moving in a forward-to-aft direction. The struts 35 can comprise an airfoil shape for directing the mainstream flow F passing through the annular flow passage 86, such as from a swirling flow to a substantially axial flow in one example. Having an airfoil shape, the struts 35 can comprise a leading edge 100 and a trailing edge 102, defining a chord-wise direction from the leading edge 100 to the trailing edge 102. A midline 103 can be defined as extending in the chord-wise direction at the radial center of the strut 35. The struts 35 can further have a root 104 adjacent to the inner band 84 and a tip 106 adjacent the outer band 82, defining a span-wise direction from root 104 to tip 106.

The mount surfaces 91 comprise a bump-like geometry whose slope increases from the upstream edge to a maximum radial distance or height 108 and decreases gradually from the maximum radial height 108 to the downstream edge. The recess 90 defined by the mount surface 91 can be a substantially spherical or ellipsoidal shape (See FIG. 5), with the maximum radial height 108 can be disposed upstream the chord-wise center of the strut 35 relative to the mainstream flow F. Additionally, the maximum radial height 108 can be disposed upstream of the engine mounts 92. Further still, the maximum radial height 108 can be disposed downstream of the leading edge 100 of the strut 35. Thus, at least a portion of the recess 90 defined by the mount surface 91 can have a non-increasing radial length in a flow direction F.

The recess 90 can further define a non-increasing radial length for the annular flow passage 86 in the mainstream flow direction F along the mount surface 91. Alternatively, the mount surface 91 can be adapted such that the radial distance of the annular flow passage 86 is consistent along at least a portion of the recess 90, the strut 35, or a combination thereof. Finally, the maximum radial distance for the annular flow passage 86 can be disposed in the flow area 118 (see FIG. 3) defined between adjacent struts 35.

It should be understood that while the description herein discusses the subject matter in regard to a strut 35 and the mount surface 91, the implementation is not so limited and can be utilized as an integral strut and fairing combination, or as a fairing alone, as described. Thus, it should be understood that the geometry related to the mount surface 91 and the recess 90 therein can be applied to a fairing, utilizing the strut as an exemplary structure to which the fairing can mount, and any structure mounted to the fairing is not limited by the aerodynamic design of the strut as described herein.

Figure 5:
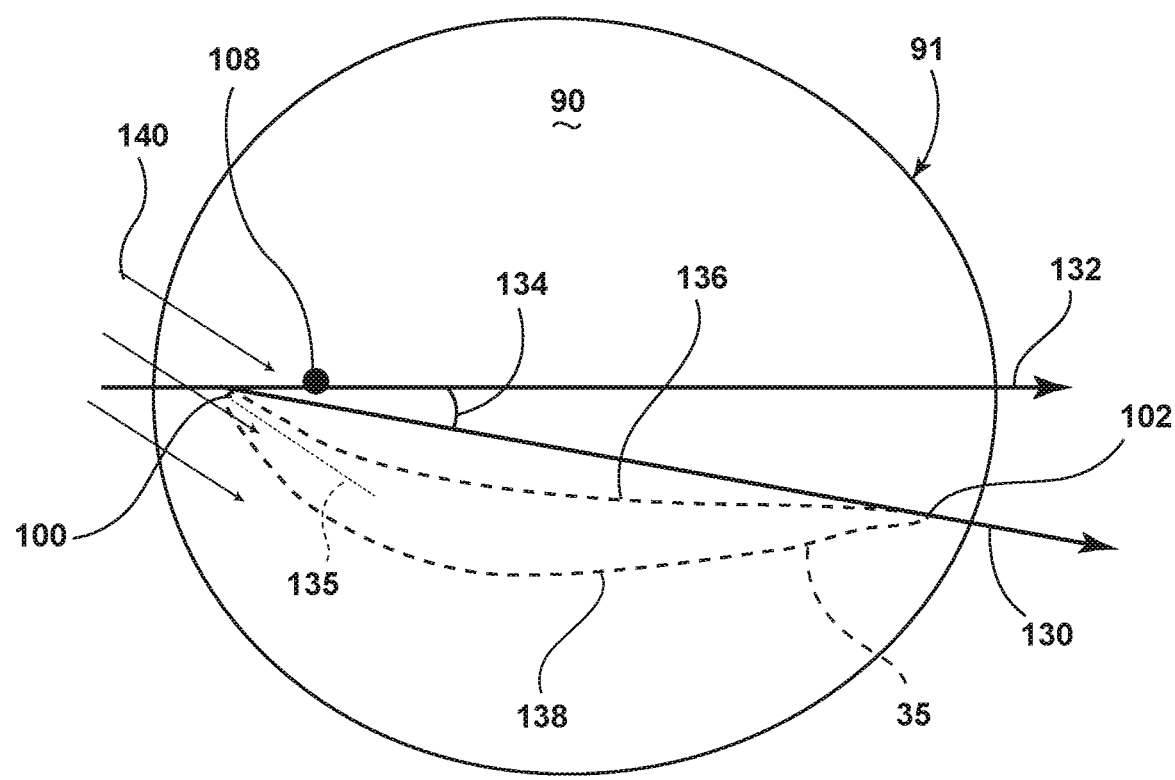
FIG. 5 is a top view combining a cross-section of a recess of a strut of the turbine rear frame of FIG. 3.

In FIG. 5, a top view of the mount surface 91 is illustrated having a midline cross-section of the strut 35 illustrated in dashed lines. A chordline 130 extends between the leading edge 100 and the trailing edge 102 of the airfoil. A pitch angle 134 can be defined between the chordline 130 and a centerline of the mount surface 91. The pitch angle 134 can be defined as between 5-degrees and 25-degrees from the centerline 132. It is contemplated, however, that the pitch angle 134 can be as small as 1-degree or as great at 45-degrees. The chordline 130 can be defined by an orientation of the airfoil such that a pitchline 135 of the leading edge 100 is oriented in the direction of an incoming flow direction 140.

It should be understood that the maximum radial height 108 is disposed near or along the recess centerline 132, and that the height for the rest of the recess 90 decreases away from the maximum radial height 108. As such, moving axially along the centerline 132 from the maximum recess height defines a decreasing recess height. Similarly, moving laterally from the recess centerline 132 further decreases the recess height such that a minimum recess height is disposed around the periphery of the recess 90.

The airfoil shape of the strut 35 further includes an outer wall extending between the leading edge 100 and the trailing edge 102 in the chord-wise direction, and the root 104 (FIG. 4) and the tip 106 (FIG. 4) in the span-wise direction. The strut 35 defines a pressure side 136 and a suction side 138. The leading edge 100 of the strut 35 is aligned with a direction of the incoming flow direction 140 and is disposed along the centerline 132 of the mount surface 91. The maximum radial height 108 can be provided circumferentially outward from the strut 35, As a non-limiting example, the maximum radial height 108 can be provided circumferentially outward from the outer wall of the strut 35. As used herein, the term "circumferentially outward" or iterations thereof can refer to a circumferential displacement, with respect to the engine centerline 12 (FIG. 1), of the maximum radial height 108 with respect to the strut 35. The pressure side 136 of the airfoil faces the maximum radial height 108 and is spaced from the centerline 132 aft of the leading edge 100. The suction side 138, disposed opposite of the pressure side 136, is disposed further from the recess centerline 132, adjacent to a lower recess height than that of the pressure side 136.

Figure 6:
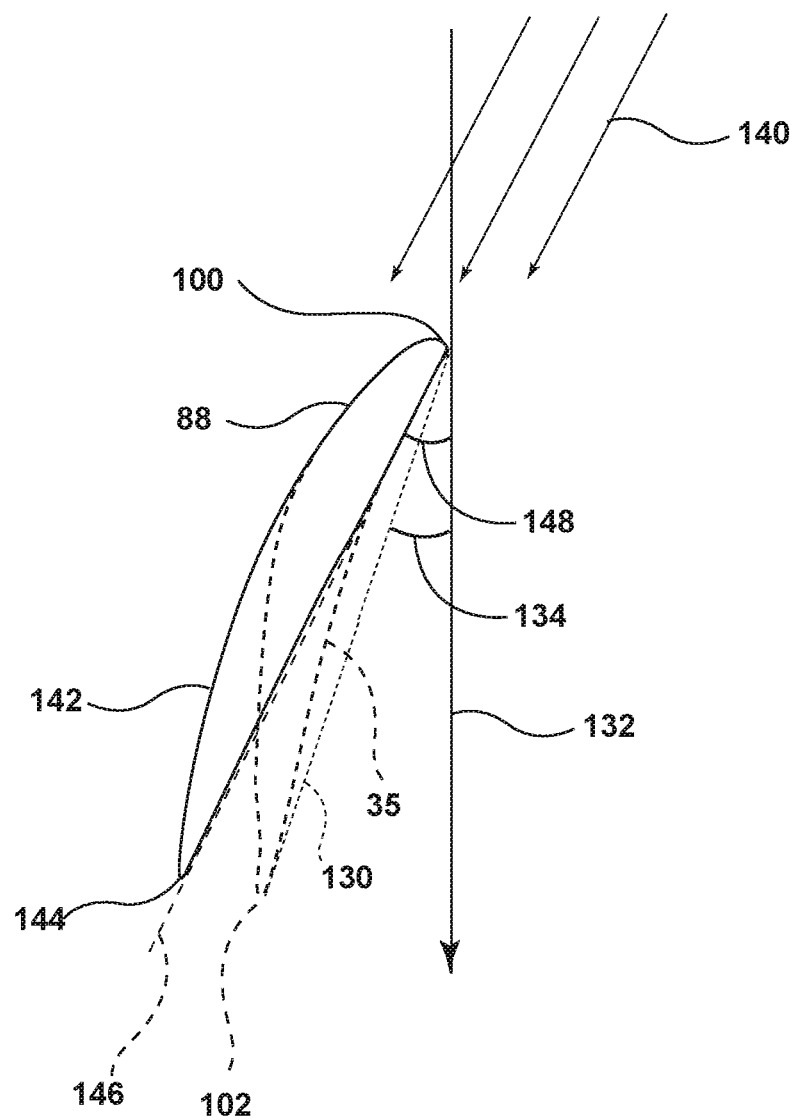
FIG. 6 is a top view of the strut of FIG. 5 illustrating a midline cross-section and a tip cross-section.

In FIG. 6, the cross-section of the strut 35 at the midline along the span-wise length of the strut 35 is illustrated in dashed lines, defining the pitch angle 134 of FIG. 5 in comparison to a tip cross-section 142 in solid line. The trailing edge 102 can curve tangentially near the tip or radially outer 50% of the strut in the direction of the incoming flow direction 140, illustrated as a curved trailing edge 144. As can be appreciated, the tangential curve of the trailing edge 144 can define a tip chordline 146 having a tip pitch angle 148 being greater than the pitch angle 134 of the rest of the strut 35 resultant of the tangential curve to the trailing edge 144 of the strut 35. It should be understood that the tangential curve for the trailing edge 102 can be disposed in the radially outer 50% of the airfoil and is not limited to adjacent the tip. Furthermore, the radially inner 50% of the airfoil can be curved tangentially in the same direction as the radially outer 50% or can be curved in the opposite direction as the radially outer 50%.

It should be appreciated that the recess, having a maximum radial distance disposed forward of the mounting lugs provides for lower pressure losses in the frame which decreases specific fuel consumption. Furthermore, the forward position of the maximum radial distance provides room for engine mounts within the lug mounts without the need for a diverging end of the strut, which can also result in pressure losses. Additionally, the improved design of the lug mounts provides for increased design control of the airfoil shape of the struts adjacent to the lug mounts. The aspects as described further provide for a lower flow separation from the rear frame and a cleaner flow from the rear frame which can improve nozzle aerodynamic performance. Further still, the radial length of the annular flow passage adjacent to the strut can be non-diverging and can be converging, such that pressure losses are further decreased.

It should be further appreciated that placing the leading edge adjacent to the bump centerline with the pressure side adjacent to the centerline provides for up to 10% lower overall pressure losses or more as compared to conventional designs. Orienting the pitchline of the leading edge relative to the direction of the incoming airflow and utilizing a pitch angle of 5-to-25 degrees relative the lug mount centerline can further improve overall aerodynamic efficiency. Finally, a tangential curve of the trailing edge of the tip along the lug mount can provide further increases in aerodynamic efficiency.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine rear frame for a gas turbine engine having an engine centerline comprising:
   an outer ring located at a first radius from the engine centerline and having at least one mount surface located at a second radius from the engine centerline, with a difference between the first and second radii defining a recess comprising a bump-like geometry, wherein the second radius is smaller than the first radius and the difference has a maximum, defining a maximum radial height of the recess;
   an inner ring located within the outer ring defining an annular flow passage between the outer ring and the inner ring;
   at least one strut located within the annular flow passage and extending between the inner ring and the outer ring having a leading edge and a trailing edge defining a chord-wise direction therebetween, an outer wall of the at least one strut spanning between the leading edge and the trailing edge, and defining a suction side and a pressure side; and
   at least two spaced engine mounts provided in the recess of the outer ring;
   wherein the maximum radial height is upstream the at least two spaced engine mounts, and spaced circumferentially outward from the outer wall of the at least one strut.

2. The turbine rear frame of claim 1 wherein the at least one strut has an airfoil shape defining the leading edge, the trailing edge, a root located at the inner ring, and a tip located at the recess of the outer ring, and adjacent struts being circumferentially spaced to define a flow area therebetween.

3. The turbine rear frame of claim 1 wherein the leading edge of the strut is upstream of the maximum radial height.

4. The turbine rear frame of claim 1 wherein the at least one strut includes an airfoil shape and is oriented with the airfoil shape defining a chordline extending between the leading edge and the trailing edge and the chordline defines a pitch angle of between 5 and 25 degrees relative to a local flow direction.

5. The turbine rear frame of claim 4 wherein a pitchline at the leading edge is oriented relative to a flow direction.

6. The turbine rear frame of claim 5 wherein the trailing edge of the airfoil shape is curved tangentially relative to a radius of the engine centerline within a radially outer 50% span of the strut.

7. The turbine rear frame of claim 1 wherein a radially inner 50% span of the strut is curved in at least one of the same or opposite tangential direction relative to the radius of the engine centerline as the radially outer 50% span of the strut.

8. The turbine rear frame of claim 1 wherein the at least one strut defines a span-wise body axis extending from a root to a tip and the span-wise body axis defines an angle with respect to the engine centerline.

9. A vane segment for a turbine rear frame of a gas turbine engine having an engine centerline, the vane segment defining a chord-wise distance between a leading edge and a trailing edge, and comprising circumferentially spaced airfoils, each defining a pressure side and a suction side, positioned between portions of outer and inner rings, the outer ring located at a first radius from the engine centerline and having a mount surface located at a second radius from the engine centerline, with a difference between the first and second radii defining a recess, wherein the second radius is smaller than the first radius and the difference has a maximum, defining a maximum radial height of the recess, the vane segment further including at least two spaced engine mounts provided within the recess, wherein the maximum radial height is upstream the at least two spaced engine mounts, and wherein the pressure side faces the maximum radial height of at least one of the circumferentially spaced airfoils, and the maximum radial height is circumferentially spaced from the pressure side of the at least one of the circumferentially spaced airfoils.

10. The vane segment of claim 9 wherein the leading edge and the trailing edge define a chordline extending between the leading edge and trailing edge and the chordline defines a pitch angle of between 5 and 25 degrees relative to a local flow direction.

11. The vane segment of claim 10 wherein a pitchline at the leading edge is oriented relative to the flow direction.

12. The vane segment of claim 10 wherein a trailing edge of at least one airfoil of the circumferentially spaced airfoils is curved tangentially relative to a radius of the engine centerline within a radially outer 50% span of the vane segment.

13. The vane segment of claim 12 wherein a radially inner 50% span of the vane segment is curved in at least one of the same or opposite tangential relative to the radius of the engine centerline the radially outer 50% span of the vane segment.

14. A turbine rear frame for a gas turbine engine having an engine centerline comprising:
   an outer ring located at a first radius from the engine centerline and having at least one mount surface located at a second radius from the engine centerline, with a difference between the first and second radii defining a recess comprising a bump-like geometry, wherein the second radius is smaller than the first radius and the difference has a maximum, defining a maximum radial height of the recess;
   an inner ring located within the outer ring defining an annular flow passage between the outer ring and the inner ring;
   at least one strut coupled to the mount surface and located within the annular flow passage and extending between the inner ring and the outer ring, the at least one strut having an airfoil shape including a pressure side, a suction side, a leading edge and a trailing edge and defining a chord-wise direction between the leading edge and the trailing edge, a root located at the inner ring, and a tip located at the recess of the outer ring; and
   at least two spaced engine mounts provided in the recess of the outer ring opposite the tip;

wherein the maximum radial height is spaced circumferentially outward from the at least one strut, and upstream of the at least two spaced engine mounts.

15. The turbine rear frame of claim 14 wherein the leading edge is upstream of the maximum radial height.

16. The turbine rear frame of claim 14 wherein the mount surface is further shaped to define a portion of the annular flow passage along the mount surface such that the recess includes a non-increasing radial length in an axial direction measured perpendicular to the engine centerline and downstream of the maximum radial height.

17. The turbine rear frame of claim 14 wherein the strut is oriented with the airfoil shape defining a chordline extending between the leading edge and trailing edge and the chordline defines a pitch angle of between 5 and 25 degrees relative to a local flow direction.

18. The turbine rear frame of claim 17 wherein a pitchline of the airfoil shape at the leading edge is oriented relative to the flow direction.

19. The turbine rear frame of claim 18 wherein the trailing edge of the airfoil shape is curved tangentially relative to a radius of the engine centerline within a radially outer 50% span of the strut.

20. The turbine rear frame of claim 19 wherein a radially inner 50% span of the strut is curved in at least one of the same or opposite tangential direction relative to the radius of the engine centerline as the radially outer 50% span of the strut.

21. The turbine rear frame of claim 14 wherein the at least one strut defines a span-wise body axis extending from the root to the tip and the span-wise body axis defines an angle with respect to the engine centerline.

22. The turbine rear frame of claim 14 wherein the at least one strut comprises two circumferentially spaced struts forming a nozzle area in between.

23. The turbine rear frame of claim 22 wherein a maximum radial distance of the annular flow passage is disposed in the nozzle area.

* * * * *